June 19, 1962  W. LEHMANN  3,040,201
METHOD OF PROCESSING ELECTROLUMINESCENT PHOSPHOR
AND ELECTROLUMINESCENT DEVICE
Filed March 3, 1960  4 Sheets-Sheet 1

INVENTOR.
WILLI LEHMANN.
BY
W. D. Palmer
ATTORNEY.

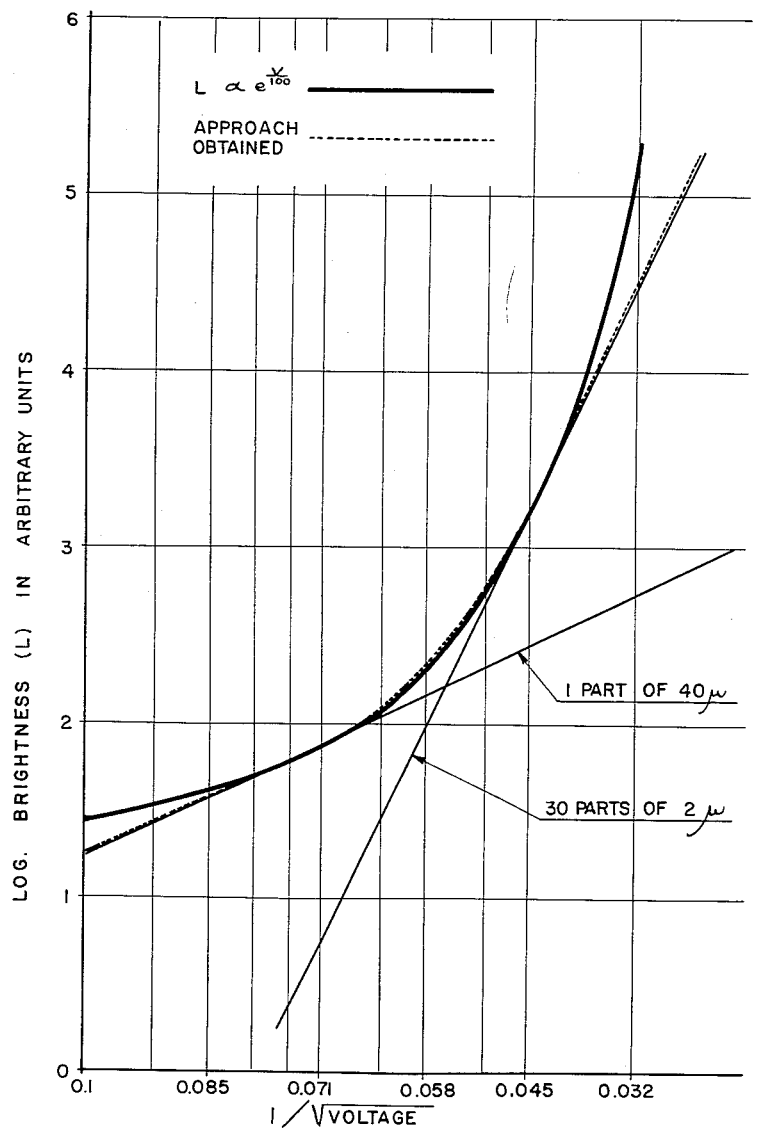

United States Patent Office 3,040,201
Patented June 19, 1962

3,040,201
METHOD OF PROCESSING ELECTROLUMINESCENT PHOSPHOR AND ELECTROLUMINESCENT DEVICE
Willi Lehmann, Livingston, N.J., assignor to Westinghouse Electric Corporation, East Pittsburgh, Pa., a corporation of Pennsylvania
Filed Mar. 3, 1960, Ser. No. 12,616
5 Claims. (Cl. 313—108)

This invention relates to a method of processing electroluminescent phosphor and, more particularly, to a method for obtaining desired operating characteristics for electroluminescent phosphor and an electroluminescent device which incorporates such phosphor.

The phenomenon of electroluminescence was first disclosed by G. Destriau, one of his earlier publications appearing in London, Edinburgh and Dublin Philosophical Magazine, Series 7, vol. 38, No. 285, pages 700–737 (October 1947). Since this early publication, electroluminescent devices have been marketed commercially. For some applications such as electroluminescent display devices, it is desirable to obtain special performance characteristics, as expressed in terms of brightness versus applied voltage or applied electric field. Heretofore it has not been practical to fabricate electroluminescent devices in such manner that special performance characteristics could be readily obtained.

It is the general object of this invention to avoid and overcome the foregoing and other difficulties of and objections to prior-art practices by the provision of a method for processing electroluminescent phosphor in order to obtain predetermined special operating characteristics for a device incorporating such phosphor.

It is another object to provide a method for processing electroluminescent phosphor to obtain, for a device incorporating such phosphor, special predetermined operating characteristics as expressed in terms of a plot of brightness versus applied electric field or applied voltage.

It is a further object to provide method details for processing electroluminescent phosphor in order to obtain special predetermined desired operating characteristics for a device incorporating such phosphor.

It is an additional object to provide an electroluminescent device which will display special predetermined operating characteristics.

The aforesaid objects of the invention, and other objects which will become apparent as the description proceeds, are achieved by providing a method for processing electroluminescent phosphor wherein the phosphor is prepared as separate fractions, each of which has a different predetermined average phosphor particle size. These prepared fractions are then mixed together in such predetermined amounts as required to achieve predetermined desired operating characteristics, as expressed in terms of brightness versus applied electric field or applied voltage. There is also provided the electroluminescent device which incorporates such phosphor.

For a better understanding of the invention, reference should be had to the accompanying drawings wherein:

FIG. 8 is a curve of log. brightness versus the reciprocal of the square root of applied voltage, wherein predetermined amounts of two predetermined fractions of phosphor have been mixed in order to achieve desired performance characteristics for the device incorporating such mixed phosphor fractions.

Figure 1:
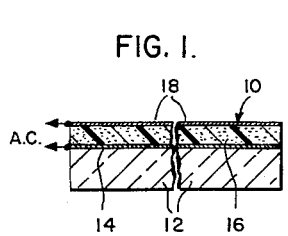
FIG. 1 is a sectional-elevational view of an electroluminescent device incorporating phosphor processed in accordance with this invention.

With specific reference to the form of the invention illustrated in the drawings, in FIG. 1 is shown an electroluminescent device 10 which generally comprises a glass foundation 12 having coated thereon a first electrode 14 which is formed of light-transmitting and electrically-conducting tin oxide. Coated over the electrode 14 is a layer 16 comprising electroluminescent phosphor which has been processed in accordance with the present invention. Over the layer 16 is a second electrode 18 which is formed of vacuum-metallized aluminum or light-transmitting copper iodide for example. An alternating potential is adapted to be applied across the electrodes 14 and 18 in order to energize the electroluminescent phosphor to light emission.

The tin oxide electrode 14 can be formed of other suitable light-transmitting, electrically-conducting material such as indium or titanium oxides or copper iodide. In this specific example, the phosphor, which has been processed as explained hereinafter, is mixed with equal parts by weight of a light-transmitting dielectric such as polyvinyl-chloride acetate and the thickness of the layer 16 is approximately 75 microns. The thickness of the layer 16 is not critical and can be varied considerably. If desired, a separate layer of dielectric can be included between the electrodes 14 and 18 or the dielectric can be dispensed with entirely and powdered phosphor compacted between the two electrodes of the device without any mixed dielectric. Either or both of the electrodes 14 and 18 can be replaced by a mesh of wires or the electrodes for the device 10 can be formed as an interlacing mesh of wires with phosphor therebetween, as disclosed in U.S. Patent No. 2,684,450, dated July 20, 1954.

The phosphor which is used in the layer 16 can comprise any electroluminescent phosphor such as a zinc sulfide type or a zinc selenide or sulfo-selenide as described in U.S. Patents No. 2,859,367, dated November 4, 1958 and No. 2,847,386, dated August 12, 1958. Zinc sulfide phosphors are preferred and will be considered in detail. Before processing in accordance with the present invention, the phosphor is first prepared as per conventional practices, which include firing at a predetermined temperature and for a predetermined time a mixture comprising zinc sulfide, copper salt and either a halide or a salt of a 3-valent metal or both. The zinc sulfide constituent forms the phosphor matrix and to the best of present knowledge, the copper salt provides the primary activator while the halide or 3-valent metal salt provides the coactivator. Suitable coactivators for copper-activated zinc sulfide phosphor are chlorine, bromine, iodine, aluminum, scandium, gallium or indium or any mixtures thereof. As an example, the copper activator is added to the raw mix in such amount as to constitute from 0.1 to 10 mole percent of the zinc sulfide and the total coactivator is present in the raw mix in amount of from 0.01 to 10 gram-atom percent of the zinc. The preferred phosphor coactivator is chlorine and reference is made to U.S. Patent No. 2,874,128, dated February 7, 1959 for details for preparing copper-activated zinc sulfide phosphor which is coactivated by chlorine. By way of further example, zinc sulfide in amount of 10 grams is mixed with 0.2 mole percent of copper as acetate and 0.13 gram-atom percent of chlorine as ammonium chloride. To this is added 5% by weight of the raw mix of elemental sulphur. The mixture is fired in a nitrogen atmosphere in a partially-closed container at a temperature of 950° C. for ninety minutes. Desirably the phosphor is crushed and refired in a similar manner. After the phosphor is prepared by firing, it is desirably washed in a solution which is a solvent for cuprous sulfide, but which is not a solvent for zinc sulfide, in order to remove excess cuprous sulfide from the surface of the prepared phosphor. As a specific example, the fired phosphor is washed in a one-normal solution of sodium, potassium or ammonium cyanide, thiosulphate or thiocyanate, or any mixtures of the foregoing. The preferred washing solution is a basic solution of sodium cyanide. The concentration of the washing solution is not critical and can vary over a wide range. After washing, the phosphor is water rinsed and then dried. Other group II B metal sulfides can be substituted for a part of the zinc sulfide, such as mercuric sulfide or a mixture of mercuric and cadmium sulfides and reference is made to copending application S.N. 807,730, filed April 20, 1959, and owned by the present assignee, for description of such a phosphor. Other activators such as manganese or lead can be used to supplement the primary copper activator and such electroluminescent phosphors are well known.

As background to the present invention, electroluminescent phosphors as prepared display average particle sizes which vary depending on the type of phosphor and conditions of preparation. As an example, electroluminescent zinc sulfides are normally prepared as fine powders with particle sizes ranging over a broad distribution of from about 1 micron to about 50 microns, with the peak of the curve of particle numbers versus particle diameters varying from about 6 microns to about 12 microns or greater. The particle size distribution for such phosphor is closely approximated by the following equation:

$$y = ax^2 e^{-2x/x_0} \quad (I)$$

In the foregoing Equation I, "$x$" is the particle diameter, "$x_0$" is that particle diameter which corresponds to the peak of the function "$y(x)$," "$a$" is a constant and the function "$ydx$" is the number of particles between the size limits "$x$" and "$x+dx$." The brightness "$L$" of an electroluminescent phosphor having a particle size distribution expressible by the foregoing Equation I varies with the applied electric field (as expressed in terms of applied voltage) in such manner as to closely approximate the following equation:

$$L = L_0 e^{-(V_0/V)^{1/2}} \quad (II)$$

In the foregoing Equation II, "$L_0$" and "$V_0$" are constants and "$V$" is the applied voltage. In contrast to the foregoing Equation II, it has been found that where the phosphor particles all have the same particle size, the brightness of an electroluminescent device as varying with the applied field (as expressed in terms of voltage) is closely approximated by the following equation:

$$L = L_1 e^{-(V_1/V)} \quad (III)$$

In the foregoing Equation III, "$L_1$" and "$V_1$" are constants. The Equation III generally corresponds to the equation designated (II) except that the exponent is not expressed as a square root. The foregoing formulas are primary of interest as background information with respect to a mathematical analysis of the present invention. For such an analysis, reference is made to publication of W. Lehmann, the inventor herein, appearing in the Journal of the Electrochemical Society, volume 107, pages 20–26 (January 1960).

Figure 2:
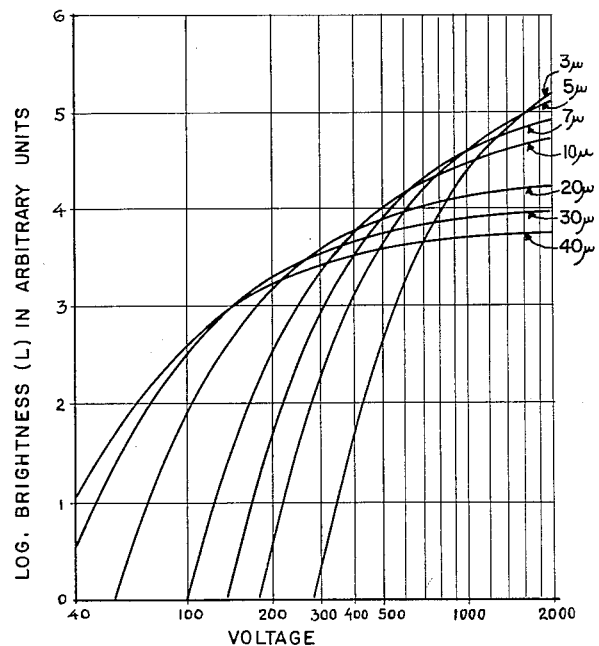
FIG. 2 is a graph of log. brightness versus log. applied voltage, illustrating performance curves for electroluminescent devices incorporating phosphor fractions of different particle size.

In accordance with the present invention, electroluminescent phosphor is first prepared as a plurality of separate fractions, each of which fractions has a different predetermined particle size. The values of particle size may represent either an average particle size of more or less broad particle size distribution or a predetermined size which all particles of the fraction closely approach. As stated hereinbefore, different phosphor fractions will display different operating characteristics when incorporated into an electroluminescent device. In FIG. 2 are shown curves of log. brightness versus log. voltage for otherwise identical electroluminescent devices incorporating phosphor fractions in which substantially all particles had the indicated particle sizes. In order to prepare phosphor fractions in which substantially all particles have substantially the same size, a sedimentation or liquid-setting technique can be conveniently employed. As an example, 10 grams of zinc sulfide electroluminescent phosphor activated by copper and coactivated by chlorine was suspended in a 50-centimeter-tall column of ethanol at a temperature of 20° C. The phosphor was allowed to settle for a period of 70 minutes. After this period of time, all phosphor still in suspension comprised particles smaller than 9 microns in diameter, while the settled fraction contained all particles of the original sample which had particle diameters greater than 9 microns. Of course the settle fraction of phosphor also included some particles having a diameter less than 9 microns. The settled phosphor was resuspended and resettled ten times in the same way. After each 70-minute settling period, the phosphor still in suspension was separated from the settled phosphor. The phosphor which still remained in suspension after the indicated settling time contained substantially no particles which had a diameter of 9 microns and greater and the settled phosphor contained substantially no particles having a diameter of less than 9 microns. Thereafter the latter or larger fraction was suspended and settled and resuspended and resettled in a manner similar to the previous procedure, but with only a 46-minute settling time. This resulted in a separation cut-off of approximately 11 microns. Thus a small fraction of phosphor was separated which displayed substantially no particles having a diameter less than 9 microns and greater than 11 microns and this fraction very closely approximated a phosphor fraction displaying a uniform particle diameter of about 10 microns. In a manner similar to that described hereinbefore, other phosphor fractions having very uniform particle sizes of 3 microns, 5 microns, 7 microns, 20 microns, 30 microns and 40 microns were separated. By way of further example, the settling times required to separate these phosphor fractions were: 15 hours and 7¾ hours for the 3-micron fraction, 4⅔ hours and 3 hours for the 5-micron fraction, 2 hours and 100 minutes for the 7-micron fraction, 16 minutes and 13 minutes for the 20-micron fraction, 7⅓ minutes and 5½ minutes for the 30-micron fraction and 3⅝ minutes and 3¼ minutes for the 40-micron fraction. A 2-micron fraction can be obtained with settling periods of 30 hours and 20 hours.

Equal parts by weight of each of the resulting phosphor fractions were then incorporated into identical test devices. In preparing each of these devices, one gram of the phosphor was mixed with one gram of castor oil dielectric material and incorporated into an electroluminescent device having a total electrode spacing of 75 microns. A six-micron-thick layer of separate dielectric material was also included between the device electrodes to inhibit any tendencies for electrical breakdown. Similar test devices were used in taking all of the curves shown in FIGS. 2 through 8. As shown in the curves in FIG. 2, different operating characteristics as expressed in terms of log. brightness versus log. voltage were obtained for each test electroluminescent device. It should be noted that the abscissa values for these curves could be expressed in other units. As an exmple, applied field or log. applied field could be substituted for log. voltage on the abscissa and the ordinate brightness values could be plotted to other than a log. scale. It should thus be understood that while the performance curves as described hereinbefore are described in terms of brightness vs. voltage, this is merely a matter of convenience of expression since voltage and not field values are measured. The voltage values could readily be converted to electric field gradients and as a specific example, for the foregoing electroluminescent test device, an applied potential of 300 volts is equivalent to an applied field of 4 volts per micron.

Figure 3:
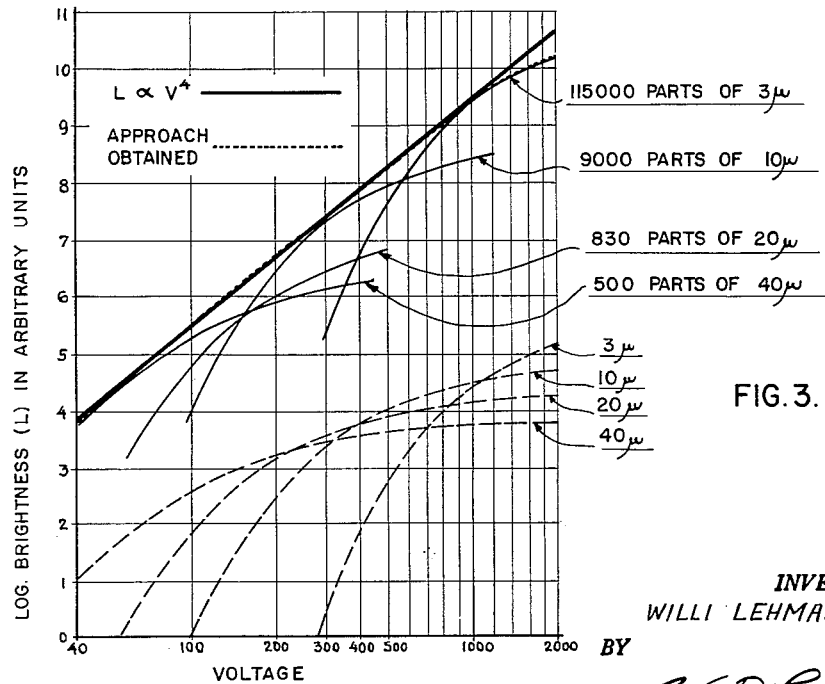
FIG. 3 is a graph of log. brightness vs. log. applied voltage showing performance curves for devices incorporating selected phosphor fractions and a special performance curve for a device incorporating predetermined relative amounts of the indicated phosphor fractions.

In FIG. 3 are reproduced from FIG. 2 the operating characteristics for the devices incorporating the 3, 10, 20 and 40 micron phosphor fractions, see the lower dashed curves. Also shown in FIG. 3 are the special predetermined device operating charcteristics (proportional to $L=V^4$ and shown as a heavy solid line) which are desired to be obtained. Such operating characteristics are normally not readily obtainable with electroluminescent devices and the operating characteristics for such devices will normally approach the equation designated (III) hereinbefore, inasmuch as the separated fractions are comprised of particles which closely approach the indicated particle sizes. It has been found that predetermined relative amounts of preselected phosphor fractions can be mixed to produce a device having such desired special operating characteristics. The required relative quantities of each fraction can be determined mathematically, but it is much simpler to determine such relative quantities by an empirical (trial-and-error) method. Such an empirical procedure is graphically illustrated in FIG. 3. By way of further explanation, if the dashed curves for the indicated fractions are extended in their ordinate values so that the summation of brightnesses (shown as a dotted line) at least closely approach the predetermined desired curve, it is then possible to measure the ordinate differences between the extended continuous curves and the corersponding dashed curves. The relative ordinate differences determine the relative proportions of each phosphor fraction as are required to produce the special desired operating characteristics for a device incorporating such mixed fractions. As an example and as shown in FIG. 3, if 500 parts by weight of the 40-micron fraction, 830 parts by weight of the 20-micron fraction, 9,000 parts by weight of the 10-micron fraction and 115,000 parts by weight of the 3-micron fraction are mixed and incorporated into an electroluminescent device, the resulting operational curve of log. brightness versus log. applied volts, shown as a dotted line, will substantially correspond to a curve represented by the equation $L \propto V^4$.

Figure 4:
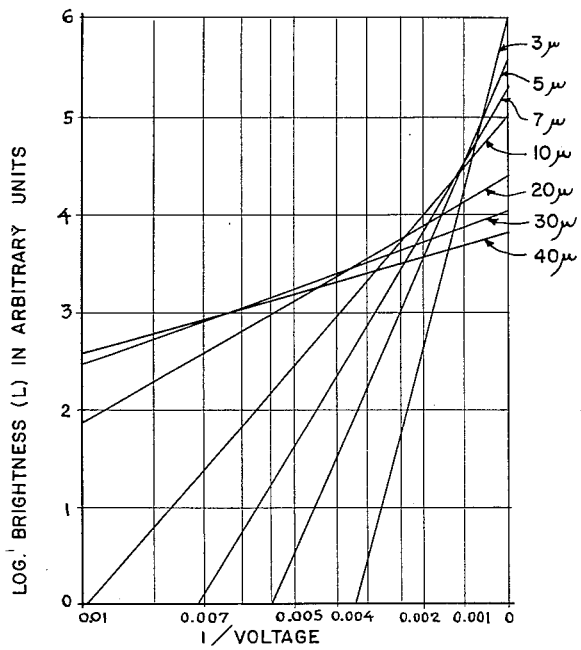
FIG. 4 is a graph of log. brightness versus the reciprocal of applied voltage illustrating performance curves which essentially correspond to the curves as shown in FIG. 2 except that the abscissa values are plotted to a different scale.

In FIG. 4 are shown curves of brightness versus voltage wherein the voltage is expressed as the reciprocal of applied volts. The phosphor fractions as shown in these curves were the same fractions as are shown in FIG. 2, except that the curves for these fractions are straight lines because of the ordinate and abscissa scale; compare these curves with Equation III hereinbefore.

Figure 5:
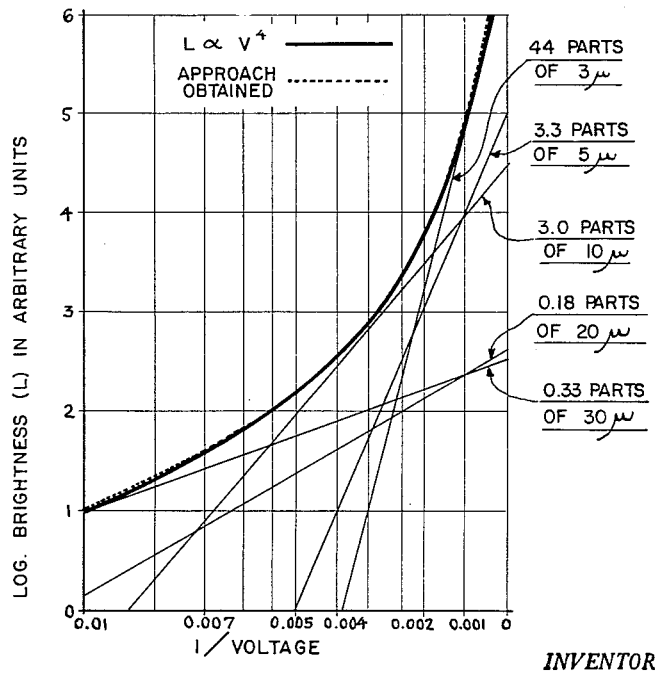
FIG. 5 is a graph of log. brightness versus the reciprocal of the applied voltage showing performance curves for devices incorporating different phosphor fractions mixed in predetermined amounts in order to obtain predetermined desired operating characteristics.

In FIG. 5 are shown the 3-micron, 5-micron, 10-micron, 20-micron and 30-micron fractions corresponding to those shown in FIG. 4, but used in such relative quantities that a device incorporating these mixed fractions in the indicated amounts will operate with a predetermined characteristic which is represented by $L \propto V^4$, shown as a heavy curve. The realized approximation of this curve is shown as a dotted curve. As previously noted, the required relative proportions of the mixed fractions are best determined by an empirical approach.

Figure 6:
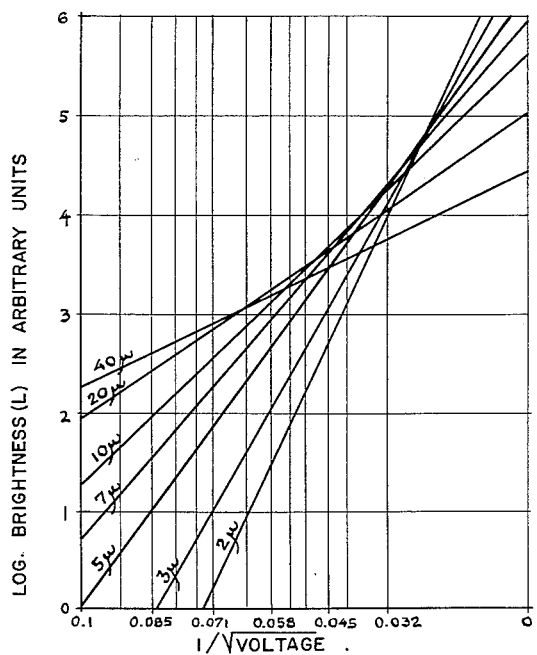
FIG. 6 is a curve of log. brightness versus the reciprocal of the square root of applied voltage, illustrating operating characteristics for devices incorporating phosphor fractions of different average particle size.

In the usual case, it will not be convenient or practical to fractionate the phosphor in such manner that the individual fractions will have very few particles which have a diameter appreciably different from that indicated, such as 40 microns for example. Electroluminescent devices incorporating phosphor fractions which have a different average particle size, but normal particle distribution, will display different operating characteristics. In FIG. 6 are shown performance curves (expressed as log. brightness vs. $1\sqrt{V}$) for such devices incorporating the phosphor fractions as indicated. These curves are staright lines and conform to Equation II hereinbefore. Phosphors having a different average particle size and normal particle size distribution can be prepared by varying the firing procedure and in the usual case, the lower the firing temperature and the shorter the firing time, the more finely divided the phosphor and the smaller the average particle size. Alternatively, such phosphor fractions can be prepared using a liquid-settling technique as described hereinbefore, except that each fraction is only settled once so that each separated fraction will have an average particle size distribution.

Figure 7:
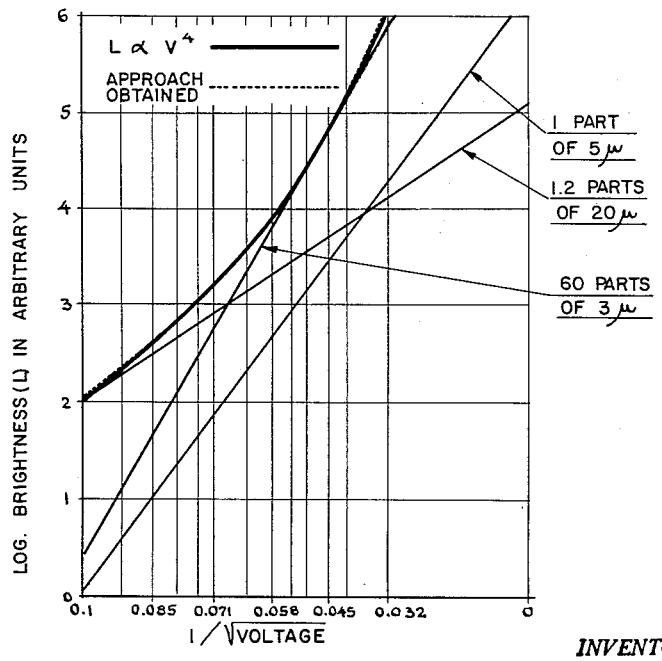
FIG. 7 is a curve of log. brightness versus the reciprocal of the square root of applied voltage, wherein three different phosphor fractions have been mixed in selected relative amounts in order to achieve desired performance characteristics for the device incorporating such mixed phosphor fractions.

In FIG. 7 are shown curves illustrating the operation of devices incorporating predetermined mixed relative amounts of a 3-micron phosphor average particle fraction, a 5-micron average particle fraction, and a 20-micron average particle fraction. These three fractions when mixed in the indicated proportions of 60 parts, 1.0 part and 1.2 parts respectively and incorporated into an electroluminescent device will cause the device to operate with characteristics which approximate $L \propto V^4$.

It is also possible to approximate other predetermined desired operating characteristics and in FIG. 8 are illustrated performance curves for electroluminescent devices incorporating a 40-micron average particle size phosphor fraction, a 2-micron average particle size phosphor fraction and a mixture of the indicated relative proportions of 1 part and 30 parts respectively of these fractions. As shown, device incorporating the phosphor mixture has predetermined operating characteristics which approximate $L \propto e^{V/100}$.

From the foregoing specific examples, it is apparent that an almost infinite number of special operating characteristics for electroluminescent devices can be obtained. As an example, the performance of the device can be tailored to be proportional to $L=aV$, $L=aV^n$, $$L=a \sin (bV)$$

and $L=Ae^{(bV)-a}$, where $a$, $b$, and $n$ are preselected constants. In any of the resulting devices, it is possible to make the brightness-voltage characteristics for such devices reproducible over many decades of brightness, as shown hereinbefore in FIGS. 3, 5, 7 and 8.

It will be recognized that the objects of the invention have been achieved by providing a method for processing electroluminescent phosphor in order to obtain predetermined special operating characteristics for a device incorporating such phosphor, as well as method details for processing such phosphor. There has also been provided an electroluminescent device which will display special predetermined operating characteristics as are normally not readily obtainable.

While best embodiments of the invention have been illustrated and described in detail, it is to be particularly understood that the invention is not limited thereto or thereby.

I claim:

1. The method of processing electroluminescent phosphor to obtain for a device incorporating such processed phophor predetermined brightness (L) versus applied voltage (V) operating characteristics which approximate $L \propto V^4$, which method comprises: preparing electroluminescent phosphor as separate fractions having respective particle diameters of $3\mu$, $10\mu$, $20\mu$ and $40\mu$; and mixing together the prepared phosphor fractions in amounts proportional to the following: 115,000 parts by weight of the $3\mu$ fraction, 9,000 parts by weight of the $10\mu$ fraction, 830 parts by weight of the $20\mu$ fraction and 500 parts by weight of the $40\mu$ fraction.

2. The method of processing copper activated zinc sulfide electroluminescent phosphor to obtain for a device incorporating such processed phosphor predetermined brightness (L) versus applied voltage (V) operating characteristics which approximate $L \propto V^4$, which method comprises: preparing such electroluminescent phosphor as separate phosphor fractions having respective particle diameters of $3\mu$, $5\mu$, $10\mu$, $20\mu$ and $30\mu$, and mixing together the prepared phosphor fractions in amounts proportional to the following: 44 parts by weight of the $3\mu$ fraction, 3.3 parts by weight of the $5\mu$ fraction, 3.0 parts by weight of the $10\mu$ fraction, 0.18 part by weight of the $20\mu$ fraction; and 0.33 part by weight of the $30\mu$ fraction.

3. The method of processing electroluminescent phosphor to obtain for a device incorporating such processed phosphor predetermined brightness (L) versus applied voltage (V) operating characteristics which approximate $L \propto V^4$, which method comprises: preparing electroluminescent phosphor as separate fractions having respective average particle diameters of $3\mu$, $5\mu$ and $20\mu$; and mixing together the prepared phosphor fractions in amounts proportional to the following: 60 parts by weight of the $3\mu$ fraction, 1.0 part by weight of the $5\mu$ fraction and 1.2 parts by weight of the $20\mu$ fraction.

4. The method of processing electroluminescent phosphor to obtain for a device incorporating such processed phosphor predetermined brightness (L) versus applied voltage (V) operating characteristics which approximate $L \propto e^{V/100}$, which method comprises, preparing electroluminescent phosphor as separate fractions having respective average particle diameters of $2\mu$ and $40\mu$, and mixing together the prepared phosphor fractions in amounts proportional to the following: 1 part by weight of the $40\mu$ fraction and 30 parts by weight of the $2\mu$ fraction.

5. The method of processing electroluminescent phosphor to obtain, for a device incorporating such processed phosphor, a brightness versus applied electric field operating characteristic which differs from that brightness versus applied electric field operating characteristic normally obtainable for a device incorporating such phosphor as unprocessed, which method comprises, obtaining from said electroluminescent phosphor separate phosphor fractions each having a different predetermined average particle diameter, and mixing together such separate fractions in such relative proportions as to produce a mixed phosphor fraction blend having a particle size distribution substantially differing from that of said phosphor before processing.

References Cited in the file of this patent
UNITED STATES PATENTS

| | | |
|---|---|---|
| 2,728,870 | Gungle et al. | Dec. 27, 1955 |
| 2,824,992 | Bouchard et al. | Feb. 25, 1958 |
| 2,911,553 | Joorman et al. | Nov. 3, 1959 |